(12) United States Patent
Huang

(10) Patent No.: US 10,368,060 B2
(45) Date of Patent: *Jul. 30, 2019

(54) HEAD MOUNTED DISPLAY

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 115 days.

This patent is subject to a terminal disclaimer.

(21) Appl. No.: 15/435,315

(22) Filed: Feb. 17, 2017

(65) Prior Publication Data
US 2018/0160104 A1 Jun. 7, 2018

(30) Foreign Application Priority Data

Dec. 6, 2016 (TW) .............................. 105140200 A

(51) Int. Cl.
*H04N 13/344* (2018.01)
*G02B 27/01* (2006.01)
*H04N 13/398* (2018.01)

(52) U.S. Cl.
CPC ....... *H04N 13/344* (2018.05); *G02B 27/0172* (2013.01); *H04N 13/398* (2018.05); *G02B 2027/0134* (2013.01)

(58) Field of Classification Search
CPC .. H04N 13/332; H04N 13/344; H04N 13/346; G02B 27/01; G02B 27/0101;

(Continued)

(56) References Cited

U.S. PATENT DOCUMENTS 5,483,307 A * 1/1996 Anderson .......... G02B 26/0833
353/98
6,094,309 A * 7/2000 Ophey ............... G02B 27/0037
359/618

(Continued)

FOREIGN PATENT DOCUMENTS

CN 104635341 A 5/2015
EP 1186933 A1 3/2002

(Continued)

OTHER PUBLICATIONS

Yuchang Wang, Junejei Huang, "3D head mount display with single panel", Delta Electronics, Inc. (Taiwan) Published in SPIE Proceedings vol. 9192, Current Developments in Lens Design and Optical Engineering XV, Sep. 2014.

*Primary Examiner* — Nicholas R. Pasko
(74) *Attorney, Agent, or Firm* — CKC & Partners Co., LLC

(57) ABSTRACT

A head mounted display includes a first and second light sources, a light turning prism, a field lens group, an image output module, a first and second eyepiece modules. The first and second light sources are respectively configured to emit first and second lights. The image output module is configured to receive the first light and the second light, and to respectively generate a first image light and a second image light with corresponding image information. The light turning prism is optically coupled between the first light source (or the second light source) and the field lens group. The light turning prism is configured to vary a propagating direction of the first light (or the second light) from the first light source (or the second light source) to the image output module. The first/second eyepiece modules are configured to make the second/first image light image to first/second target positions.

17 Claims, 6 Drawing Sheets

(58) Field of Classification Search
CPC .............. G02B 27/017; G02B 27/0172; G02B 27/2235; G02B 27/2242
USPC .................. 359/629–633; 345/7–9; 348/115; 349/11
See application file for complete search history.

(56) References Cited

U.S. PATENT DOCUMENTS

| | | | | |
|---|---|---|---|---|
| 6,246,383 B1* | 6/2001 | Ophey | ............... | G02B 27/0172 345/8 |
| 6,271,808 B1* | 8/2001 | Corbin | ............... | G02B 27/0172 345/7 |
| 6,657,602 B2* | 12/2003 | Endo | ...................... | G09G 3/002 345/8 |
| 6,795,042 B1* | 9/2004 | Nagata | ............... | G02B 27/0172 345/15 |
| 6,972,735 B2* | 12/2005 | Hebert | ............... | G02B 27/0172 345/8 |
| 7,206,135 B2* | 4/2007 | Yamazaki | .......... | G02B 17/0848 345/8 |
| 8,416,501 B2* | 4/2013 | Nakanishi | ............ | G02B 26/101 345/7 |
| 9,829,716 B1* | 11/2017 | Huang | ................. | G02B 25/001 |

FOREIGN PATENT DOCUMENTS

| | | |
|---|---|---|
| TW | 200839288 A | 10/2008 |
| WO | 2005/062629 A1 | 7/2005 |

* cited by examiner

HEAD MOUNTED DISPLAY

RELATED APPLICATIONS

This application claims priority to Taiwan Application Serial Number 105140200, filed Dec. 6, 2016, which is herein incorporated by reference.

BACKGROUND

Technical Field

The present disclosure relates to a head mounted display. More particularly, the present disclosure relates to a stereo head mounted display.

Description of Related Art

In recent years, with the increasing development of virtual reality technology, an optical product which can show a stereoscopic image has become a focal point in the consumer market. Conventionally, a head mounted display can respectively provide different images to the two eyes of an observer, and the eyes of the observer can respectively receive different image information, so that the observer can perceive a stereoscopic image by exploiting the binocular parallax of typical human sight. However, a conventional head mounted display has a complex structure, a huge size and a heavy weight, which may affect wearing convenience and comfort of the observer.

SUMMARY

The disclosure provides a head mounted display, which can provide a stereo display with a wide field of view, and reduce a size of the head mounted display, so as to improve a convenience and a comfort of wearing the head mounted display.

In accordance with some embodiments of the present disclosure, a head mounted display includes a first light source, a second light source, a light turning prism, an image output module, a first eyepiece module and a second eyepiece module. The first light source is configured to emit a first light. The second light source is configured to emit a second light. The image output module is configured to receive the first light and the second light, and to respectively generate a first image light and a second image light with corresponding image information. The light turning prism is configured to vary a propagating direction of the first light from the first light source to the image output module and vary a propagating direction of the second light from the second light source to the image output module. The first eyepiece module is configured to make the second image light image to a first target position. The second eyepiece module is configured to make the first image light image to a second target position. The first light source is disposed between the light turning prism and the first eyepiece module, and the second light source is disposed between the light turning prism and the second eyepiece module.

In one or more embodiments of this disclosure, by such configuration of the light turning prism, the field lens group and the image output module, the first light source is disposed between the first eyepiece module and the light turning prism, and the second light source is disposed between the second eyepiece module and the light turning prism. Therefore, the devices of the head mounted display along a horizontal direction and a perpendicular direction may be disposed compactly, so as to reduce a volume of the head mounted display, benefiting to minimize the size of the head mounted display. Moreover, in accordance with the relative configuration and choice of each device and module of the present disclosure, the head mounted display of the present disclosure can provide a stereo display with a wide field of view, so as to improve the comfort of the head mounted display.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
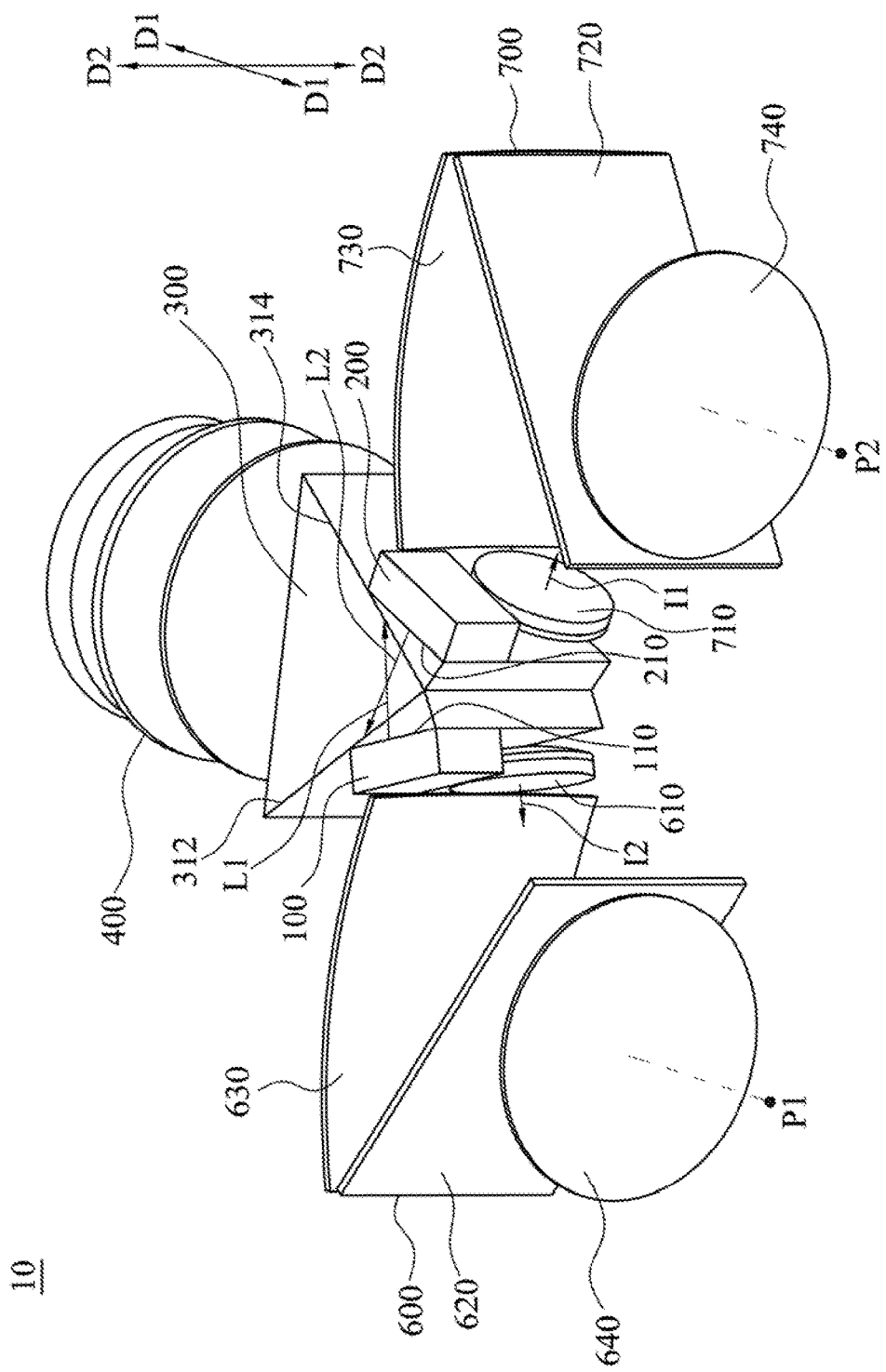
FIG. 1 is a perspective view of a head mounted display in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Furthermore, the term "device A is optically coupled to device B" indicates a light from or through the device A can directly propagate into the device B, and if a light from or through the device A can propagate into the device B, the other optical devices can be interposed between the device A and the device B. Similarly, the term "device A is optically coupled between device B and device C" indicates a light can propagate into the device A, device B and device C, and other optical devices can be interposed between the device A, device B and the device C.

Figure 2:
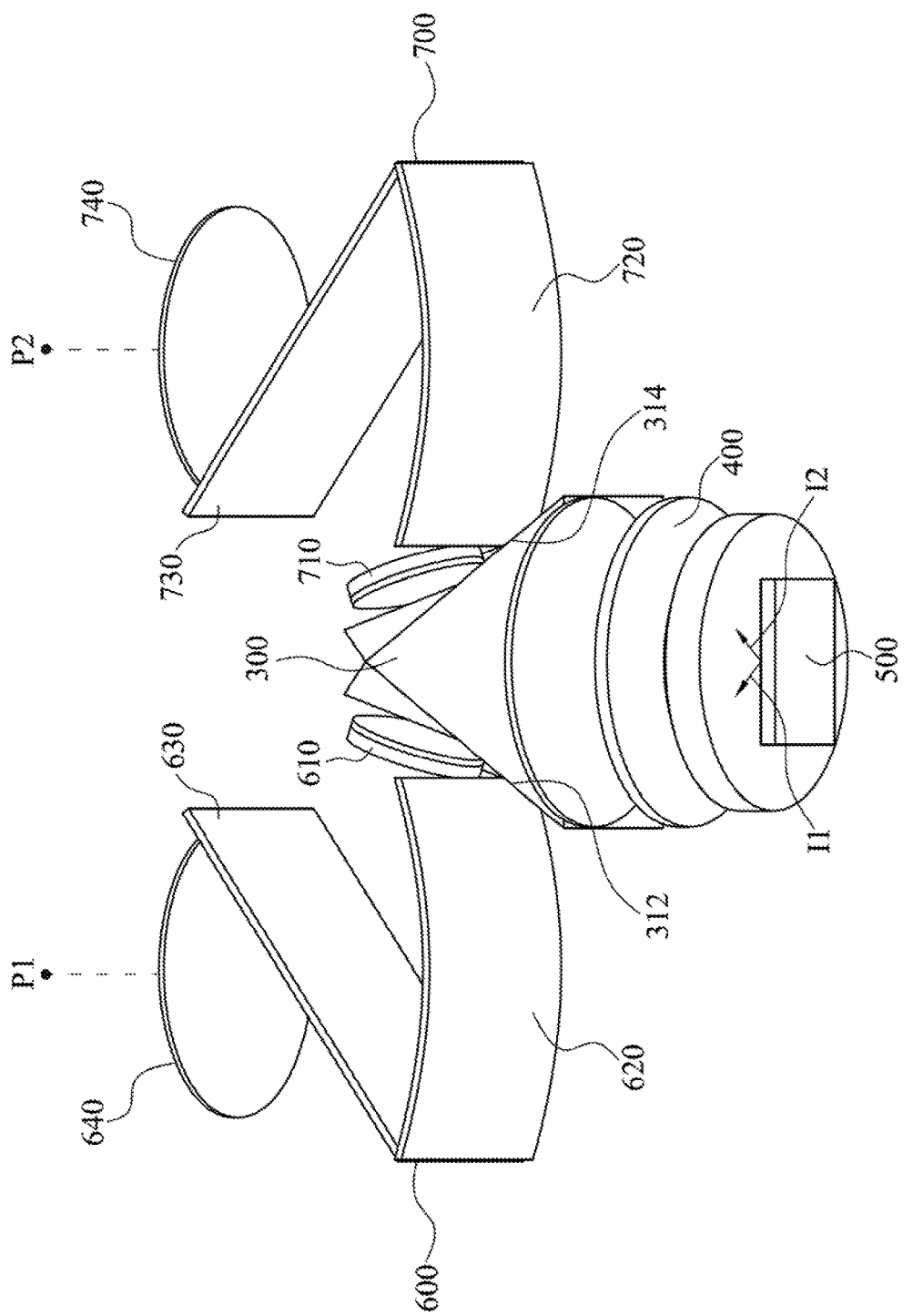
FIG. 2 is a perspective view of a head mounted display in another view in accordance with some embodiments of the present disclosure.

Reference is made to FIG. 1 and FIG. 2. FIG. 1 is a perspective view of a head mounted display in accordance with some embodiments of the present disclosure. FIG. 2 is a perspective view of a head mounted display in another view in accordance with some embodiments of the present disclosure. In some embodiments, the head mounted display 10 includes a first light source 100, a second light source 200, a light turning prism 300, a field lens group 400, an image output module 500, a first eyepiece module 600 and a second eyepiece module 700. The first light source 100 is configured to emit a first light L1. The second light source 200 is configured to emit a second light L2. The image output module 500 is configured to receive the first light L1 and the second light L2, and to respectively generate a first image light I1 and a second image light I2 with corresponding image information. The light turning prism 300 is optically coupled between the first light source 100 and the field lens group 400, and optically coupled between the second light source 200 and the field lens group 400. The light turning prism 300 is configured to vary a propagating direction of the first light L1 from the first light source 100 to the image output module 500 and vary a propagating direction of the second light L2 from the second light source 200 to the image output module 500. The first eyepiece module 600 is configured to make the second image light I2 image to a first target position P1. The second eyepiece module 700 is configured to make the first image light I1 image to a second target position P2. The first light source 100 is disposed between the light turning prism 300 and the first eyepiece module 600, and the second light source 200 is disposed between the light turning prism 300 and the second eyepiece module 700. As a result, the head mounted display 10 can respectively provide the two eyes of an observer with different image information (that is, the first image light I1 and the second image light I2), and then the different image information received by the two eyes of the observer may be combined in a brain of the observer, so that the observer may perceive a stereoscopic image.

More particularly, in some embodiments, the field lens group 400 is optically coupled between the light turning prism 300 and the image output module 500. The field lens group 400 may be configured to adjust an incident angle of the first light L1 at the image output module 500, making the first light L1 spaced apart from the first image light I1. Similarly, the field lens group 400 may be configured to adjust an incident angle of the second light L2 at the image output module 500, making the second light L2 spaced apart from the second image light I2. As a result, by such configuration of the light turning prism 300 and the field lens group 400, the first light L1 and the first image light I1 may not intersecting each other, the level height where the first light source 100 being located may substantially be different from that of the first eyepiece module 600 being, and level height where the first eyepiece module 600 being located may be substantially equal to that of the image output module 500 being. Similarly, the second light L2 and the second image light I2 may not be intersecting each other, the level height where the second light source 200 being located may substantially be different from that of the second eyepiece module 700 being, and level height where the second eyepiece module 700 being located may be substantially equal to that of the image output module 500 being. Therefore, as shown in FIG. 1 and FIG. 2, the devices of the head mounted display 10 along a horizontal direction and a perpendicular direction D2 may be disposed compactly, so as to reduce a volume of the head mounted display 10, with the benefit of minimizing the size of the head mounted display.

In some embodiments, as shown in FIG. 1 and FIG. 2, the light turning prism 300 includes a first light-redirecting surface 312 and a second light-redirecting surface 314, the first light-redirecting surface 312 and the second light-redirecting surface 314 being intersecting each other. The first light-redirecting surface 312 is configured to redirect the propagating direction of the second light L2 in a reflecting manner, and the second light-redirecting surface 314 is configured to redirect the propagating direction of the first light L1 in the reflecting manner. The first light-redirecting surface 312 is more proximal to the first light source 100 than the second light-redirecting surface 314 being, and the second light-redirecting surface 314 is more proximal to the second light source 200 than the first light-redirecting surface 200 being. In other words, the first light source 100 is more proximal to the first light-redirecting surface 312 than the second light source 200 being, and the second light source 200 is more proximal to the second light-redirecting surface 314 than the first light source 100 being. More particularly, the first light source 100 has a light emitting surface 110, and the second light source 200 has a light emitting surface 210. The light emitting surface 110 of the first light source 100 is toward the first light-redirecting surface 312 of the light turning prism 300, and the light emitting surface 210 of the second light source 200 is toward the second light-redirecting surface 314 of the light turning prism 300. In other words, the light emitting surface 110 of the first light source 100 and the light emitting surface 210 of the second light source 200 are opposite to each other. An extending surface of the light emitting surface 110 and an extending surface of the light emitting surface 210 may form an angle less than 180 degree.

Figure 3:
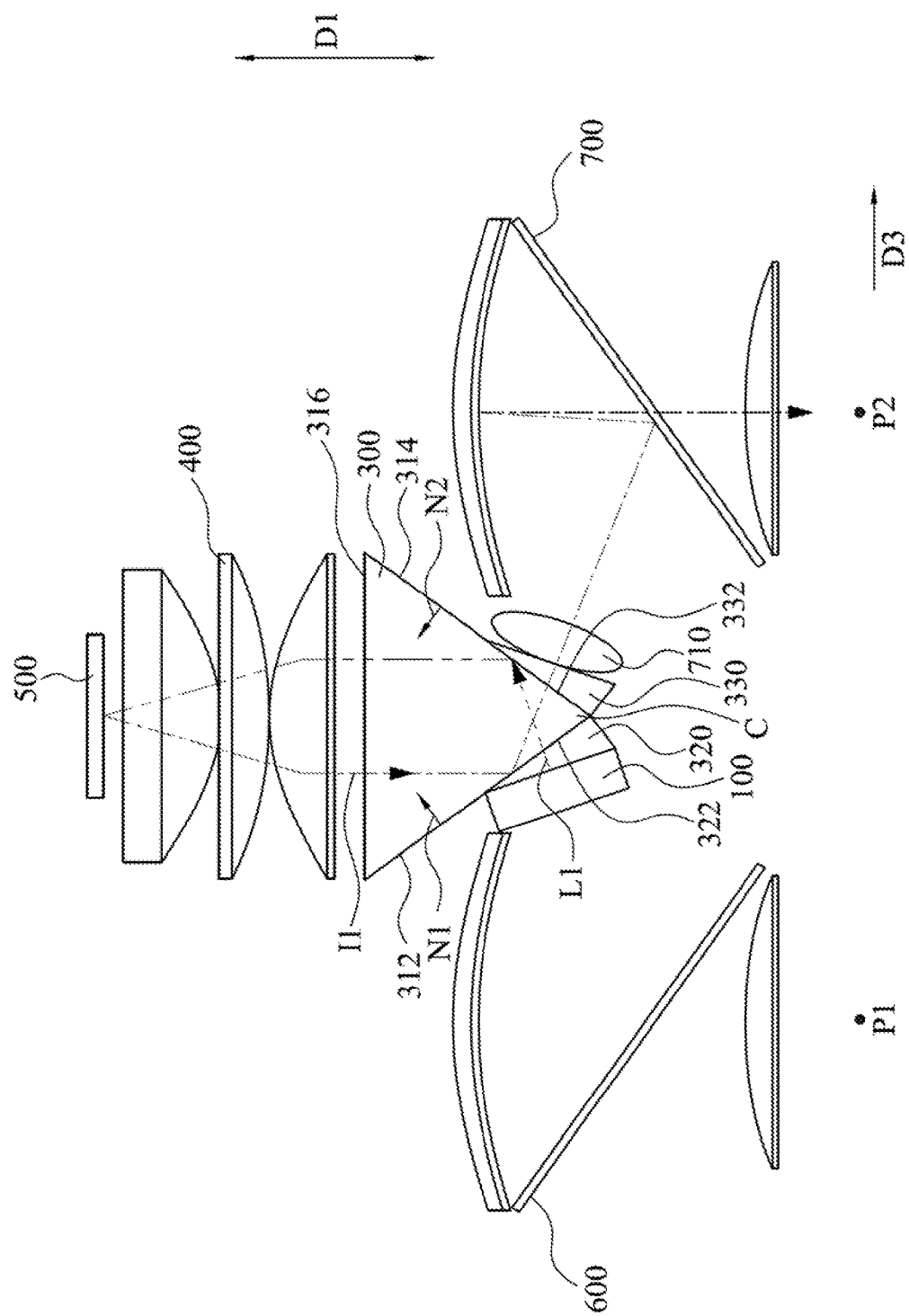
FIG. 3 is a schematic diagram showing an optical path of the first light source of the head mounted display in accordance with some embodiments of the present disclosure.

Reference is made to FIG. 3. FIG. 3 is a schematic diagram showing an optical path of the first light source of the head mounted display in accordance with some embodiments of the present disclosure. It should be understood that, the second light source 200 is omitted in FIG. 1 to explain the optical path of the first light source 100 more clearly. In practical applications, the head mounted display 10 has the first light source 100 and the second light source 200 simultaneously, and the second light source 200 is disposed above a second eyepiece unit 710. In some embodiments, the first light L1 from the first light source 100 is reflected and redirected to the image output module 500 by the second light-redirecting surface 314. More particularly, when the first light source 100 emits the first light L1, the first light L1 may transmit the first light-redirecting surface 312 of the light turning prism 300 and propagate to the second light-redirecting surface 314. The second light-redirecting surface 314 may reflect the first light L1, so the first light L1 may be propagated along an arranged direction D1 of the light turning prism 300 and field lens group 400 and arrive at the image output module 500.

Figure 4:
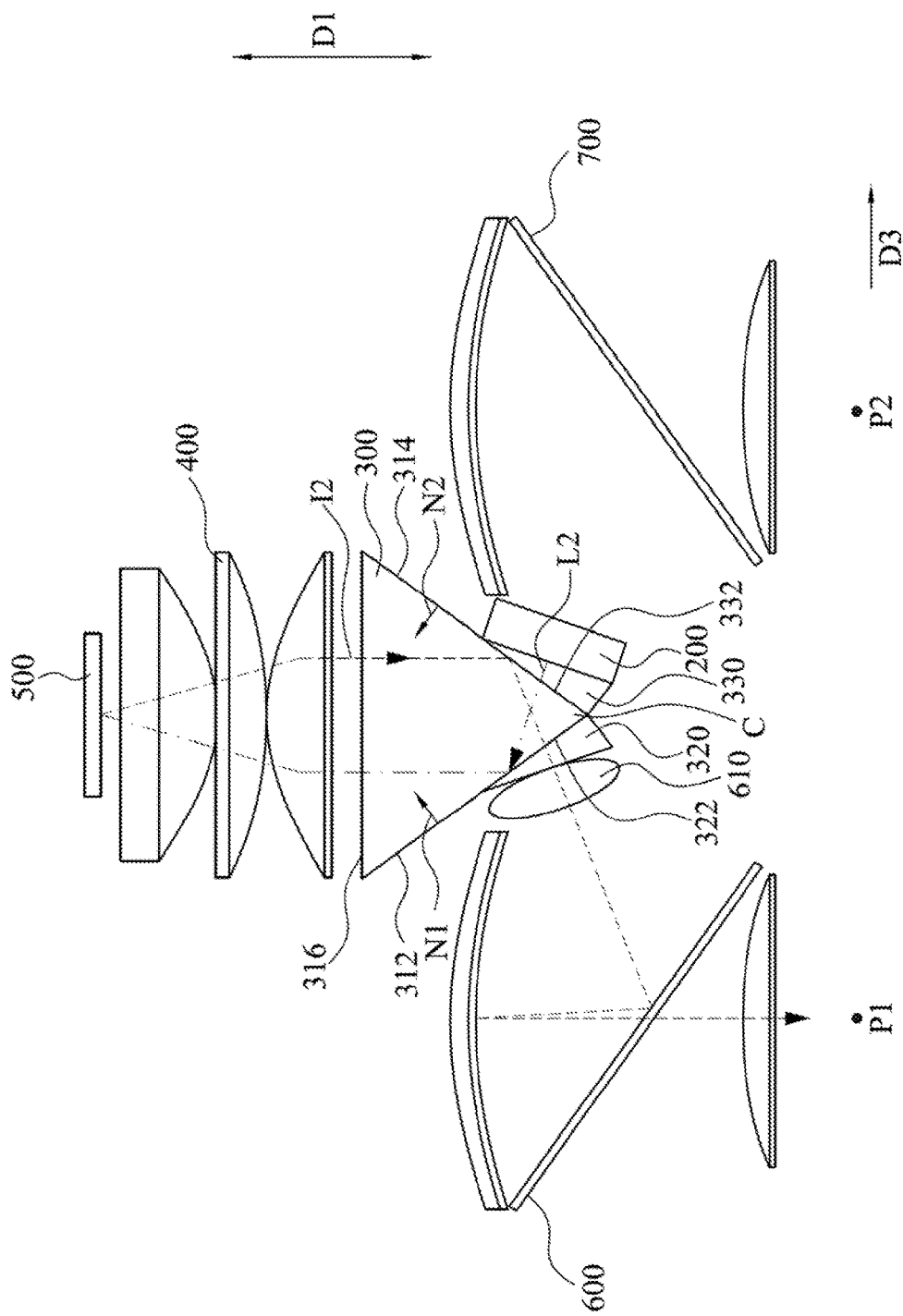
FIG. 4 is a schematic diagram showing an optical path of the second light source of the head mounted display in accordance with some embodiments of the present disclosure.

Reference is made to FIG. 4. FIG. 4 is a schematic diagram showing an optical path of the second light source of the head mounted display in accordance with some embodiments of the present disclosure. It should be understood that, the first light source 100 is omitted in FIG. 4 to explain the optical path of the second light source 200 more clearly. In practical applications, the head mounted display 10 has the first light source 100 and the second light source 200 simultaneously, and the first light source 100 is disposed above a first eyepiece unit 610. In some embodiments, the second light L2 from the second light source 200 is reflected and redirected to the image output module 500 by the first light-redirecting surface 312. More particularly, when the second light source 200 emits the second light L2, the second light L2 may transmit the second light-redirecting surface 314 of the light turning prism 300 and propagate to the first light-redirecting surface 312. The first light-redirecting surface 312 may reflect the second light L2, so the second light L2 may be propagated along the arranged direction D1 of the light turning prism 300 and field lens group 400 and arrive at the image output module 500. That is, by the light turning prism 300, the first light L1 and the second light L2 may be redirected and propagate toward the image output module 500.

In some embodiments, as shown in FIG. 3, a vertical distance between the second light-redirecting surface 314 of the light turning prism 300 and the image output module 500 is decreasing along a direction D3 from the first light source 100 towards the second light source 200. In other words, the second light-redirecting surface 314 has a normal line N2 being towards the top left of the figure. As a result, according to a law of reflection, the incident light and the reflected light are respectively on the opposite sides of the normal line. Therefore, when the first light L1 transmits the first light-redirecting surface 312 and arrives at the second light-redirecting surface 314, the second light-redirecting surface 314 may reflect the first light L1, making the propagation direction of the first light L1 be redirected from the top right of the figure to the direction D1 and arrive at the image output module 500.

Similarly, as shown in FIG. 4, a vertical distance between the first light-redirecting surface 312 of the light turning prism 300 and the image output module 500 is increasing along the direction D3 from the first light source 100 towards the second light source 200. In other words, the first light-redirecting surface 312 has a normal line N1 being towards the top right of the figure. As a result, according to a law of reflection, when the second light L2 transmits the second light-redirecting surface 314 and arrives at the first light-redirecting surface 312, the first light-redirecting surface 312 may reflect the second light L2, making the propagation direction of the second light L2 be redirected from the top left of the figure to the direction D1 and arrive at the image output module 500.

In some embodiments, as shown in FIG. 3 and FIG. 4, the head mounted display 10 includes a connection surface 316. The connection surface 316 connects the first light-redirecting surface 312 and the second light-redirecting surface 314. For example, the connection surface 316, the first light-redirecting surface 312 and the second light-redirecting surface 314 may be connected in series to form a triangular top view as shown in FIG. 3 and FIG. 4. An output optical path of the image output module 500 may go through the connection surface 316. More particularly, as shown in FIG. 3, when the image output module 500 receives the first light L1, the image output module 500 may convert the first light L1 into the first image light I1 with corresponding image information. Then, the first image light I1 from the image output module 500 is reflected and redirected to the second eyepiece module 700 by the first light-redirecting surface 312 of the light turning prism 300. More particularly, the first image light I1 may go through the field lens module 400 and the connection surface 316 in series, and be guided into the first light-redirecting surface 312. The first light-redirecting surface 312 is designed to vary the propagation direction of the first image light I1, making the first image light I1 propagate toward the second eyepiece module 700. Similarly, as shown in FIG. 4, when the image output module 500 receives the second light L2, the image output module 500 may convert the second light L2 into the second image light I2 with corresponding image information. Then, the second image light I2 from the image output module 500 is reflected and redirected to the first eyepiece module 600 by the second light-redirecting surface 314 of the light turning prism 300. In other words, the second image light I2 may go through the field lens module 400 and the connection surface 316 in series, and be guided into the second light-redirecting surface 314. The second light-redirecting surface 314 is designed to vary the propagation direction of the second image light I2, propagating the second image light I2 towards the first eyepiece module 600.

In some embodiments, since the distance between the first light-redirecting surface 312 of the light turning prism 300 and the image output module 500 is increasing along the arrange direction D3 of the first eyepiece module 600 and the second eyepiece module 700, and the distance between the second light-redirecting surface 314 of the light turning prism 300 and the image output module 500 is decreasing along the arrange direction D3 of the first eyepiece module 600 and the second eyepiece module 700. As a result, as shown in FIG. 3, according to a law of reflection, the incident light and the reflected light are respectively on the opposite sides of the normal line, so the first light-redirecting surface 312 may vary the propagation direction of the first image light I1, making the propagation direction of the first image light I1 be redirected from the first light-redirecting surface 312 to the second light-redirecting surface 314. Similarly, as shown in FIG. 4, the second light-redirecting surface 314 may vary the propagation direction of the second image light I2, redirecting the propagation direction of the second image light I2 from the second light-redirecting surface 314 to the first light-redirecting surface 312.

It should be understood that, FIG. 3 and FIG. 4 are top views of the optical paths in the head mounted display 10, so the first light L1 and the first image light I1 in FIG. 3 look like intersecting each other, and the second light L2 and the second image light I2 in FIG. 4 look like intersecting each other. However, in practical applications, as shown in FIG. 1, the first light L1 and the first image light I1 are spaced apart from each other in the perpendicular direction D2, and the second light L2 and the second image light I2 are spaced apart from each other in the perpendicular direction D2. In some embodiments, as shown in FIG. 3 and FIG. 4, the light turning prism 300 includes a first auxiliary transmission unit 320 and a second auxiliary transmission unit 330. The first auxiliary transmission unit 320 is disposed between the first light-redirection surface 312 of the light turning prism 300 and the first eyepiece 600. The second auxiliary transmission unit 330 is disposed between the second light-redirection surface 314 of the light turning prism 300 and the second eyepiece 700. The first auxiliary transmission unit 320 may assist the first image light I1 in propagating toward the second eyepiece module 700, and the second auxiliary transmission unit 330 may assist the second image light I2 in propagating toward the first eyepiece module 600.

In some embodiments, as shown in FIG. 3, at least one air interface 322 exits between the light turning prism 300 and the first auxiliary transmission unit 320. As a result, when the second light L2 is transmitted into the first light-redirecting surface 312 of the light turning prism 300, the second light L2 may have total reflection at the first light-redirecting surface 312. That is, the second light L2 may be totally reflected to the image output module 500. Similarly, an incident angle of the first image light I1 at the first light-redirecting surface 312 is designed to be greater than a critical angle of the first light-redirecting surface 312, so the first image light I1 may have a total reflection at the first light-redirecting surface 312. That is, the first image light I1 may be totally reflected to the second eyepiece module 700.

Similarly, in some embodiments, as shown in FIG. 4, at least one air interface 332 exits between the light turning prism 300 and the second auxiliary transmission unit 330. As a result, when the first light L1 is transmitted into the second light-redirecting surface 314 of the light turning prism 300, the first light L1 may have total reflection at the second light-redirecting surface 314. That is, the first light L1 may be totally reflected to the image output module 500. Similarly, an incident angle of the second image light I2 at the second light-redirecting surface 314 is designed to be greater than a critical angle of the second light-redirecting surface 314, so the second image light I2 may have a total reflection at the second light-redirecting surface 314. That is, the second image light I2 may be totally reflected to the first eyepiece module 600.

In some embodiments, for example, first auxiliary transmission unit 320 may be a prism, or other suitable optics devices. The light turning prism 300 and the first auxiliary transmission unit 320 are connected by an adhesive glue. The adhesive glue is disposed in a peripheral portion of the first auxiliary transmission unit 320, and the adhesive glue is doped with a spacer (such as a bead), making at least one gap (such as a nano-scale gap) exit between the light turning prism 300 and the first auxiliary transmission unit 320. The gap has an air medium, that is, the air interface 322. As a result, the air interface 322 may assist the first image light I1 and the second light L2 at the first light-redirecting 314 in being totally reflected, but it is not limited. Similarly, in some embodiments, the second auxiliary transmission unit 330 may be a prism, or other suitable optics devices. The light turning prism 300 and the second auxiliary transmission unit 330 are connected by an adhesive glue, making at least one gap exit between the light turning prism 300 and the second auxiliary transmission unit 330. The gap has the air medium, that is, the air interface 332. As a result, the air interface 332 may assist the second image light I2 and the first light L1 at the second light-redirecting 314 in being totally reflected, but it is not limited.

In some embodiments, the field lens group 400 is designed to adjust an incident angle of the first light L1 (or the second light L2) at the image output module 500 and adjust a position of the first light L1 (or the second light L2) arriving at the image output module 500, making the first light L1 (or the second light L2) be converted into the first image light I1 (or the second image light I2) with correct image information. Moreover, as shown in FIG. 3, the field lens group 400 is designed to adjust the optical path of the first image light I1 and the incident angle of the first image light I1 at the first light-redirecting surface 312, making the first image light I1 not transmit through the first light-redirecting surface 312, but making the first image light I1 be reflected and redirected to the second eyepiece module 700. Similarly, as shown in FIG. 4, the field lens group 400 is designed to adjust the optical path of the second image light I2 and the incident angle of the second image light I2 at the second light-redirecting surface 314, making the second image light I2 not transmit through the second light-redirecting surface 314, but making the second image light I2 be reflected and redirected to the first eyepiece module 600. In some embodiments, for example, the field lens group 400 may include a plurality of lenses, each of the lenses has different or same radius of curvatures, refractive indexes, or material, and distances between the plurality of lenses may be adjusted for different demand, but it is not limited.

In some embodiments, for example, by designs of the position of the first light source 100 relative to the image output module 500, the position of the light turning prism 300 relative to the image output module 500, the angle formed between the normal line N1 of the first light-redirecting surface 312 and the second light L2 or the first image light I1, the angle formed between the normal line N2 of the second light-redirecting surface 314 and the first light L1 or the second image light I2, or other suitable design, the incident angles of the second light L2 and the first image light I1 at the first light-redirecting surface 312 may be greater than the critical angle of the first light-redirecting surface 312, and the incident angles of the first light L1 and the second image light I2 at the second light-redirecting surface 314 may be greater than the critical angle of the second light-redirecting surface 314, but it is not limited.

In some embodiments, as shown in FIG. 1, the first eyepiece module 600 includes a first eyepiece unit 610. An arrange direction of the first light source 100 and the first eyepiece unit 610 is substantially perpendicular to the arrange direction D3 of the first light source 100 and the second light source 200. More particularly, the first eyepiece unit 610 and the first light source 100 are separately disposed at the first light-redirecting surface 312, and the first eyepiece unit 610 is configured to receive the second image light I2. Similarly, the second eyepiece module 700 includes a second eyepiece unit 710. An arrange direction of the second light source 200 and the second eyepiece unit 710 is substantially perpendicular to the arrange direction D3 of the first light source 100 and the second light source 200. More particularly, the second eyepiece unit 710 and the second light source 200 are separately disposed at the second light-redirecting surface 314, and the second eyepiece unit 710 is configured to receive the first image light I1. As a result, the second image light I2 may go through the first light-redirecting surface 312 and propagate toward the first eyepiece unit 610, and the first image light I1 may go through the second light-redirecting surface 314 and propagate toward the second eyepiece unit 710.

In other words, in some embodiments, as shown in FIG. 1, the first eyepiece unit 610 is abutted against the first auxiliary transmission unit 320, and the second eyepiece unit 710 is abutted against the second auxiliary transmission unit 330. The first light source 100 is directly disposed above the first eyepiece unit 610, and the second light source 200 is directly disposed above the second eyepiece unit 710. As a result, the devices of the head mounted display 10 along a horizontal direction and a perpendicular direction D2 may be disposed compactly, so as to reduce a volume of the head mounted display 10, benefiting to minimize the size of the head mounted display.

In some embodiments, the image output module 500 is based on a digital light processing technology to generate the first image light I1 and the second image light I2. The digital light processing technology is based on a micro-electro-mechanical device, and the micro-electro-mechanical device may rapidly switch on/off states of each pixel, so as to reduce an image delay of the display device. Moreover, the image output module 500 based on the micro-electro-mechanical system may omit converting the light from the light source into a polarized light, and may avoid different pixels of the image output module 500 having different lifetime, so as to avoid the non-uniform brightness, or defects of the stereo image, but it is not limited.

In some embodiments, the image output module 500 is a digital micro-mirror device configured to redirect the first light L1 from the light turning prism 300 and reflect the first light L1 into the first image light I1 with the corresponding image information; the image output module 500 is configured to redirect the second light L2 from the light turning prism 300 and reflect the second light L2 into the second image light I2 with the corresponding image information. More particularly, the digital micro-mirror device may include a plurality of micro reflected mirrors, so the reflected direction of the light received by each micro reflected mirror can be controlled. Each micro reflected mirror represents an image pixel, and each micro reflected mirror can be driven by a control device, so the micro reflected mirror can be rotated to two angles corresponding to the on/off states.

In some embodiments, for example, the image output module 500 may be, but not limited to be, a digital micro-mirror device such as a tilt and roll pixel digital micro-mirror device. When the image output module 500 is the digital micro-mirror device, an incident direction of the first light L1 at the image output module 500 and a normal vector of the image output module 500 form an angle (the angle is greater than 0 degree), and an emitted direction of the first image light I1 at the image output module 500 is substantially parallel to the normal vector of the image output module 500. In other words, the digital micro-mirror device may convert the first light L1 into the first image light I1 with the corresponding image information, and the emitted direction of the first image light I1 at the digital micro-mirror device is substantially parallel to the normal vector of the digital micro-mirror device. More particularly, as shown in FIG. 3, the light turning prism 300 has a top portion C connecting the first auxiliary transmission unit 320 and the second auxiliary transmission unit 330. A left part of the top portion C may sever as an entrance of the first light L1, that is, the first light L1 may propagate from the left part of the top portion C of the light turning prism 300 into the light turning prism 300 and arrive at the image output module 500. A right part of the top portion C may sever as an exit of the first image light I1, that is, the first image light I1 may leave from the right part of the top portion C of the light turning prism 300, and be propagated toward the second eyepiece module 700.

Similarly, in some embodiments, when the image output module 500 is the digital micro-mirror device, an incident direction of the second light L2 at the image output module 500 and the normal vector of the image output module 500 form a corner (the corner is greater than 0 degree), and an emitted direction of the second image light I2 at the image output module 500 is substantially parallel to the normal vector of the image output module 500. In other words, the digital micro-mirror device may convert the second light L2 into the second image light I2 with the corresponding image information, and the emitted direction of the second image light I2 at the digital micro-mirror device is substantially parallel to the normal vector of the digital micro-mirror device. More particularly, as shown in FIG. 4, the right part of the top portion C may serve as an entrance of the second light L2, that is, the second light L2 may propagate from the right part of the top portion C of the light turning prism 300 into the light turning prism 300 and arrive at the image output module 500. The left part of the top portion C may sever as an exit of the second image light I2, that is, the second image light I2 may leave from the left part of the top portion C of the light turning prism 300, and be propagated toward the first eyepiece module 600. Generally, the left part of the top portion C of the light turning prism 300 may sever as the entrance of the first light L1 and the exit of the second image light I2, and the right part of the top portion C of the light turning prism 300 may sever as the entrance of the second light I2 and the exit of the first image light I1. In other words, if taking the field lens group 400 and the image output module 500 as an optical mechanism, an aperture of the optical mechanism may be respectively in the left part and the right part of the top portion C of the light turning prism 300.

In some embodiments, the head mounted display 10 includes a light timing control unit (not shown in the figure). The first light source 100 and the second light source 200 are connected to the light timing control unit, and the light timing control unit is configured to control the first light source 100 and the second light source 200 to emit light synchronously. In other words, the light timing control unit is configured to control the time sequence when the first light source 100 emits light to be different from that of the second light source 200 being, that is, the first light source 100 and the second light source 200 emit light alternatively. In some embodiments, for example, at a first time point, the first light source 100 emits the first light L1, the first light L1 is redirected to the image output module 500 by the light turning prism 300 for generating the first image light I1, and the first image light I1 is guided into the second target position P2 (such as a left eye of an observer) by the first eyepiece module 600. At a second time point, the second light source 200 emits the second light L2, the second light L2 is redirected to the image output module 500 by the light turning prism 300 for generating the second image light I2, and the second image light I2 is guided into the first target position P1 (such as a right eye of the observer) by the second eyepiece module 700. As a result, by rapidly switching the first light source 100 and the second light source 200 in the time sequence, the corresponding first image light I1 and the second image light I2 may be respectively imaged to the second target position P2 and the first target position P1 in the time sequence, so as to achieve a stereoscopic display of the head mounted display 10.

In some embodiments, the image output module 500 provides a plurality of reflected patterns in the time sequence, and the first light source 100 and the second light source 200 switched substantially synchronizes with the reflected patterns switched. More particularly, in some embodiments, the reflected patterns can be classified as a first group of reflected patterns and a second group of reflected patterns, and the first group of reflected patterns and the second group of reflected patterns are switched in the time sequence, that is, the image output module 500 alternately provides the first group of reflected patterns and the second group of reflected patterns according to the time sequence. For example, at the first time point, the first light source emits the first light L1 to the image output module 500, and the image output module 500 substantially provides the first group of reflected patterns in synchronization, so the image output module 500 receives the first light L1 and generates the first image light I1 with the image information of the first group of reflected patterns. Then, at the second time point, the second light source emits the second light L2 to the image output module 500, and the image output module 500 substantially provides the second group of reflected patterns in synchronization, so the image output module 500 receives the second light L2 and generates the second image light I2 with the image information of the second group of reflected patterns. In other words, at a first time t1, the first light source 100 may be controlled to emit light, and the second light source 200 may be controlled to not emit light, and the image output module 500 may be controlled to provide the first group of reflected patterns. Then, at a second time t2, the first light source 100 may be controlled to not emit light, and the second light source 200 may be controlled to emit light, and the image output module 500 may be controlled to provide the second group of reflected patterns. Accordingly, the first light L1 generated by the first light source 100 is substantially synchronized with the first group of reflected patterns generated by the image output module 500, so as to generate the first image light I1 with the corresponding correct image information, which may benefit to image the first image light I1 to the second target position P2. Similarly, the second light L2 generated by the second light source 200 is substantially synchronized with the second group of reflected patterns generated by the image output module 500, so as to generate the second image light I2 with the corresponding correct image information, which may benefit to image the second image light I2 to the first target position P1.

Figure 5:
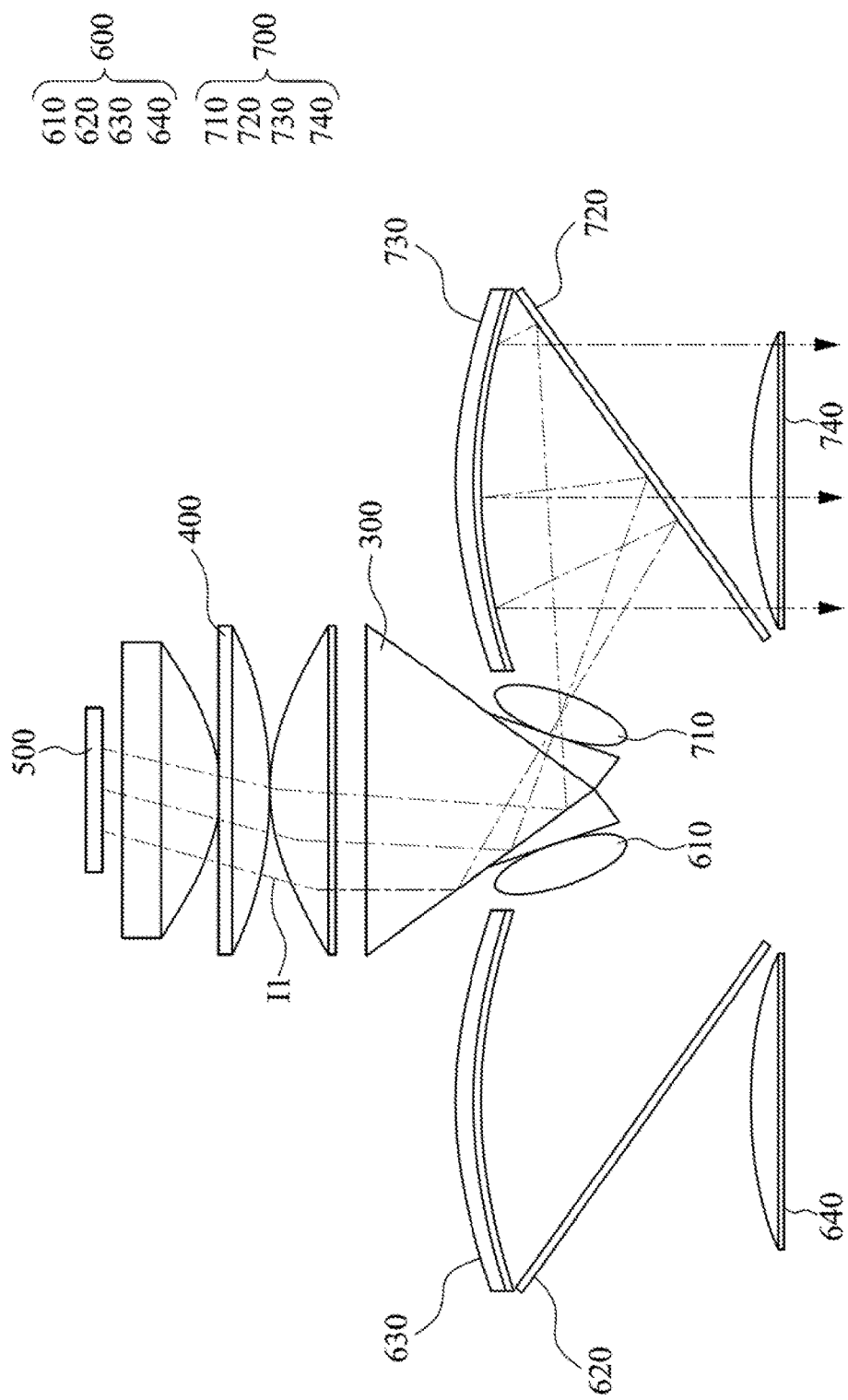
FIG. 5 is a schematic diagram showing an optical path of the first image light of the head mounted display in accordance with some embodiments of the present disclosure.

In some embodiments, reference is made to FIG. 1 and FIG. 5. FIG. 5 is a schematic diagram showing an optical path of the first image light I1 of the head mounted display in accordance with some embodiments of the present disclosure. In some embodiments, the second eyepiece module 700 includes a partially light reflective unit 720, an image-reflected mirror 730 and a second eyepiece 740. The partially light reflective unit 720 is optically coupled between the second eyepiece unit 710 and the image-reflected mirror 730. When the first image light I1 arrives at the second eyepiece unit 710, the first image light I1 may be redirected to the partially light reflective unit 720, and then the partially light reflective unit 720 may redirect a part of the first image light I1 to the image-reflected mirror 730 in a reflecting manner, thereby forming a first intermediate image, and the first intermediate image is projected to the second target position P2 by a second eyepiece 740.

Figure 6:
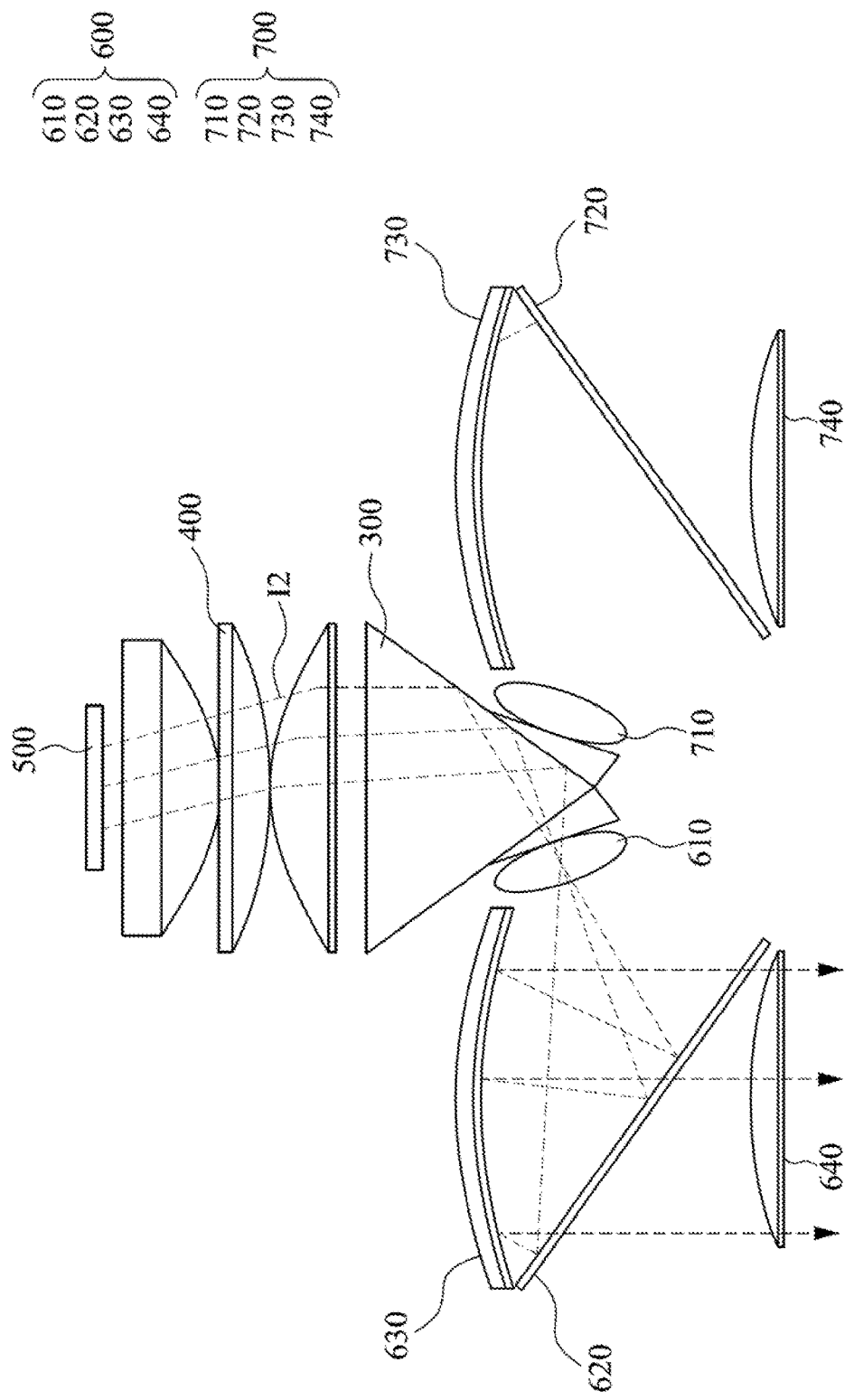
FIG. 6 is a schematic diagram showing an optical path of the second image light of the head mounted display in accordance with some embodiments of the present disclosure.

Similarly, reference is made to FIG. 1 and FIG. 6. FIG. 6 is a schematic diagram showing an optical path of the second image light I2 of the head mounted display in accordance with some embodiments of the present disclosure. In some embodiments, the first eyepiece module 600 includes a partially light reflective unit 620, an image-reflected mirror 630 and a first eyepiece 640. The partially light reflective unit 620 is optically coupled between the first eyepiece unit 610 and the image-reflected mirror 630. When the second image light I2 arrives at the first eyepiece unit 610, the second image light I2 may be redirected to the partially light reflective unit 620, and then the partially light reflective unit 620 may redirect a part of the second image light I2 to the image-reflected mirror 730 in a reflecting manner, thereby forming a second intermediate image, and the second intermediate image is projected to the first target position P1 by a first eyepiece 640.

In some embodiments, for example, the partially light reflective units 620 and 720 may be, but not limited to be, beam-splitters or totally internal reflection prisms to redirect the second image light I2 (or the first image light I1) to the image-reflected mirror 630 (or the image-reflected mirror 730).

In some embodiments, the first light source 100 may include a solid-state light source array. Similarly, the second light source 200 may include a solid-state light source array. The solid-state light source arrays may include at least one solid-state light source, such as a red light source, a green light source or a blue light source, and it may be a light emitting diode or an organic light emitting diode, but it is not limited. It should be noted that, the first light L1 emitted by the solid-state light source array of the first light source 100 is substantially a collimated light, that is, a divergence angle of the first light L1 is close to zero. Therefore, after the image output module 500 receives the first light L1, the image output module 500 may generate the substantially collimated first image light I1, so the first image light I1 may be precisely guided into the second target position P2 through the second eyepiece module 700, avoiding the first image light I1 shifting to the first target position P1. Similarly, the second light L2 emitted by the solid-state light source array of the second light source 200 is substantially a collimated light, that is, a divergence angle of the second light L2 is close to zero. Therefore, after the image output module 500 receives the second light L2, the image output module 500 may generate the substantially collimated second image light I2, so the second image light I2 may be precisely guided into the first target position P1 through the first eyepiece module 600, avoiding the second image light I2 shifting to the second target position P1.

In one or more embodiments of this disclosure, by such configuration of the light turning prism, the field lens group and the image output module, the first light source is disposed between the first eyepiece module and the light turning prism, and the second light source is disposed between the second eyepiece module and the light turning prism. Therefore, the devices of the head mounted display along a horizontal direction and a perpendicular direction may be disposed compactly, so as to reduce a volume of the head mounted display, benefiting to minimize the size of the head mounted display. Moreover, in accordance with the relative configuration and choice of each device and module of the present disclosure, the head mounted display of the present disclosure can provide a stereo display with a wide field of view, so as to improve a comfort of the head mounted display.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head mounted display, comprising:
   a first light source configured to emit a first light;
   a second light source configured to emit a second light;
   an image output module configured to receive the first light and the second light, and to respectively generate a first image light and a second image light with corresponding image information;
   a light turning prism configured to vary a propagating direction of the first light from the first light source to the image output module and vary a propagating direction of the second light from the second light source to the image output module, wherein the light turning prism has a first light-redirecting surface and a second light-redirecting surface extending to a region between the first and second light sources, a distance between the first and second light-redirecting surfaces decreases as the first and second light-redirecting surface are further away from the image output module, the first light-redirecting surface is configured to redirect the propagating direction of the second light in a reflecting manner and to allow the second image light to pass therethrough, the second light-redirecting surface is configured to redirect the propagating direction of the first light in the reflecting manner and to allow the first image light to pass therethrough, where the first light-redirecting surface is more proximal to the first light source than the second light-redirecting surface, and the second light-redirecting surface is more proximal to the second light source than the first light-redirecting surface;

a first eyepiece module configured to make the second image light image to a first target position; and a second eyepiece module configured to make the first image light image to a second target position;

wherein the first light source is disposed between the light turning prism and the first eyepiece module, and the second light source is disposed between the light turning prism and the second eyepiece module.

2. The head mounted display of claim 1, further comprising a connection surface connecting the first light-redirecting surface and the second light-redirecting surface, and an output optical path of the image output module goes through the connection surface.

3. The head mounted display of claim 1, wherein the first image light from the image output module is reflected and redirected to the second eyepiece module by the first light-redirecting surface.

4. The head mounted display of claim 1, wherein the second image light from the image output module is reflected and redirected to the first eyepiece module by the second light-redirecting surface.

5. The head mounted display of claim 1, wherein a vertical distance between the first light-redirecting surface and the image output module is increasing along a direction from the first light source towards the second light source, and a vertical distance between the second light-redirecting surface and the image output module is decreasing along the direction from the first light source towards the second light source.

6. The head mounted display of claim 1, further comprising a first auxiliary transmission unit, the first auxiliary transmission unit is disposed between the first light-redirecting surface and the first eyepiece module, and the first auxiliary transmission unit is separated from the first light-redirecting surface of the light turning prism by an air interface.

7. The head mounted display of claim 1, further comprising a second auxiliary transmission unit, the second auxiliary transmission unit is disposed between the second light-redirecting surface and the second eyepiece module, and the second auxiliary transmission unit is separated from the second light-redirecting surface of the light turning prism by an air interface.

8. The head mounted display of claim 1, wherein the image output module is a digital micro-mirror device configured to reflect and make the first light become the first image light, and to reflect and make the second light from become the second image light.

9. The head mounted display of claim 1, wherein the image output module provides a plurality of reflected patterns in a time sequence.

10. The head mounted display of claim 1, further comprising:

a field lens group optically coupled between the image output module and the light turning prism, wherein the field lens group is configured to adjust an incident angle of the first light at the image output module, and to adjust an incident angle of the second light at the image output module.

11. The head mounted display of claim 1, wherein the first light-redirecting surface and the second light-redirecting surface Intersect to form an interface located between the first and second light sources.

12. The head mounted display of claim 1, wherein the first eyepiece module has a first eyepiece unit, and the first eyepiece unit and the first light source are separately disposed at the first light-redirecting surface.

13. The head mounted display of claim 12, wherein the first light source and the first eyepiece unit are arranged in a direction substantially perpendicular to an arrangement direction of the first light source and the second light source.

14. The head mounted display of claim 12, wherein the first eyepiece module has a first partially light reflective unit and a first image mirror, the first partially light reflective unit is configured to redirect the second image light from the first eyepiece unit to the first image mirror, and the first image mirror is configured to make the first image light image to the second target position.

15. The head mounted display of claim 1, wherein the second eyepiece module has a second eyepiece unit, and the second eyepiece unit and the second light source are separately disposed at the second light-redirecting surface.

16. The head mounted display of claim 15, wherein the second light source and the second eyepiece unit are arranged in a direction substantially perpendicular to an arrangement direction of the first light source and the second light source.

17. The head mounted display of claim 15, wherein the second eyepiece module has a second partially light reflective unit and a second image mirror, the second partially light reflective unit is configured to redirect the first image light from the second eyepiece unit to the second image mirror, and the second image mirror is configured to make the second image light image to the second target position.

* * * * *